United States Patent [19]

Camac et al.

[11] 4,086,808
[45] May 2, 1978

[54] MOTION DETECTION AND MEASUREMENT

[75] Inventors: Morton Camac, Lexington; Fritz Bien, Arlington, both of Mass.

[73] Assignee: Aerodyne Research, Inc., Bedford, Mass.

[21] Appl. No.: 708,307

[22] Filed: Jul. 26, 1976

[51] Int. Cl.² .................... G01B 9/02; G01N 21/22
[52] U.S. Cl. .................................................. 73/655
[58] Field of Search ............ 73/71.3, 71.1; 350/102

[56] References Cited

U.S. PATENT DOCUMENTS

| | | | |
|---|---|---|---|
| 3,316,759 | 5/1967 | Rehder | 73/71.3 |
| 3,355,934 | 12/1967 | Foster | 73/71.3 |
| 3,782,176 | 1/1974 | Jacobs | 73/71.3 |
| 3,879,988 | 4/1975 | Jacobs | 73/71.3 |

Primary Examiner—Anthony V. Ciarlante
Attorney, Agent, or Firm—Alred H. Rosen; Frank A. Steinhilper

[57] ABSTRACT

Methods and apparatus are disclosed for measuring and monitoring vibrational or similar motion in mechanical elements. Retroreflectors on the elements are illuminated with monochromatic light, preferably a laser, and the reflected beams form an interference pattern. Shifts in the interference fringes correspond to motion which changes the relative length of the paths of reflected light and these shifts are counted or analyzed to monitor such motion. Both micro and macro motion can be monitored.

14 Claims, 7 Drawing Figures

MOTION DETECTION AND MEASUREMENT

BACKGROUND OF THE INVENTION

In a number of fields of activity there is need for analysis of motion and its effects. Flexing, turning or similar motions can require detection, analysis or monitoring in various sizes and amplitudes from very large to very small and from very slow to extremely fast. For example, it has been found that when turbine or compressor blades rotate at a high rate of speed they vibrate, and it is difficult to monitor and therefore difficult to analyze the vibration in order to determine and correct the cause.

In the past the problem of blade flutter has generally been investigated either by examination under stroboscopic illumination or by means of mirrors secured to the blades and employed to reflect a light beam as a blade passes a light source. Although these prior methods are valuable research and investigation tools, they nevertheless have shortcomings. For example, using mirrors, stroboscopic illumination or other methods it has been difficult to analyze blade flutter through a continuous path the motion. A strobe light, for example, may clearly show the position of a fast moving blade, but only at the instant of illumination. Similarly a moving mirror reflects a light signal but only as the mirror moves through the point of illumination.

A still further method of monitoring motion or change or position of shape is by means of holography. In one system of holography it is possible to record a shape or structure in a first condition of stress by holographic means and compare this first shape of structure against a second shape of structure in a second condition of stress. Again, however, the holographic methods have not been successful in monitoring an object through a continuous path of motion.

In other fields of endeavor it is also desirable to detect, measure or otherwise monitor the motion of an object primarily at rest or an object which moves through a principal path of motion while the object or parts thereof also undergo motion with respect to each other. For example, an object at rest such as a building may be monitored to detect and analyze sway or an object moving through space may rotate or otherwise turn on itself, as does an airplane, a glider or the like, and such motion can be monitored.

GENERAL NATURE OF THE INVENTION

According to the present invention a moving element such as a moving machine element can be monitored through a relatively long or even continuous path of motion by means of retroreflectors mounted on the element to receive and return a signal to an appropriate detector. The invention is applicable to a wide variety of moving elements but is described herein primarily in connection with turbine or compressor blades. In this field of use and application the invention overcomes problems which have, in the past, severely restricted investigation.

In accordance with the present invention two or more retroreflectors (sometimes known as corner reflectors) are mounted on a blade or other moving element, and the blade is moved through its path of motion under normal operating conditions. For example, the blade can be spun at extremely high speeds generally employed in operation, and the postion of the retroreflectors on the rotating blade can be monitored through a long or continuous path of motion. The path of motion is monitored by means of a light source which is coherent and monochromatic, such as a continuous wave laser. The beam is directed onto the moving blade through a substantial path of blade motion and reflected directly back to the light source by the moving retroreflectors. The return signal is reflected toward a detector, for example, by a beam splitting mirror positioned in the path of the laser beam.

According to the present invention, when two beams originally from a laser are reflected onto a detector from two retroreflectors an interference pattern is created, the distance between nodes of the pattern depending on the angle from which the two beams are reflected. If one or the other of the retroreflectors is moved toward or away from the laser and detector, thus changing the path length of the beam, the interference pattern or fringes move across the detector.

In a preferred embodiment of the invention, the detector generates a signal corresponding to the shifting of interference fringes across the detector, and this signal is counted or otherwise analyzed to determine the motion of the body on which a retroreflector is carried.

In actual practice, when the retroreflector vibrates in and out (toward or away from the detector) the detector signal oscillates in intensity, and the oscillation frequency is a measure of the relative in or out velocity of moving member.

Accordingly, when a photomultiplier or other photo device is employed as the detector, there is a high frequency signal at the time of most rapid vibratory motion, tailing off to a low frequency or near zero frequency signal at the extremities of the vibratory motion. The time between lowest frequency signals (or between highest frequencies) corresponds to period of vibration, whereas the frequency of the detector signal corresponds to velocity of the vibration and the total number of fringes denotes amplitude. Thus a count of the oscillations of the detector signal provides a measure of both frequency and amplitude of vibration.

The present invention thus provides a way of investigating blade flutter (or similar motion of other mechanical elements) and its causes throughout a long segment of the path of motion of a blade and in some cases through an entire path of blade motion, and permits such investigation through a wide variety of dynamic operating conditions. The present invention is useful for analyzing vibration in a wide variety of mechanical structure. For example, a number of mechanical elements which move through a path of motion and undergo vibration or flutter during such motion can be studied through all or part of such path of motion. Such mechanical elements include turbine blades, high speed spindles, gears, fan blades and the like. In addition many mechanical elements such as percussion drills vibrate during use and are difficult to study even though their operational motion is relatively unconsequential.

In general the present invention can solve heretofore difficult problems where operational motion is awkward or impossible to monitor and also where the type of vibrational motion is difficult to study. For example, vibration at frequencies approaching frequencies of visible light, are within the capabilities of this technology, and the highest frequencies and smallest amplitudes of mechanical vibration are easily handled by this invention.

The present invention also accommodates macro- as well as micro- problems in monitoring motion, and in another specific embodiment of the invention motion of a more distant body can be monitored. In air flight or space flight an object such as a towed glider, a satellite or the like can be followed. A glider, for example, can be observed to detect the three measures of yaw, pitch and roll.

The invention is more presently illustrated in the accompanying drawings in which:

FIG. 2 is a diagrammatic view of another embodiment of the invention in dynamic analysis of blade flutter.

DETAILED DESCRIPTION OF THE INVENTION

Figure 1:
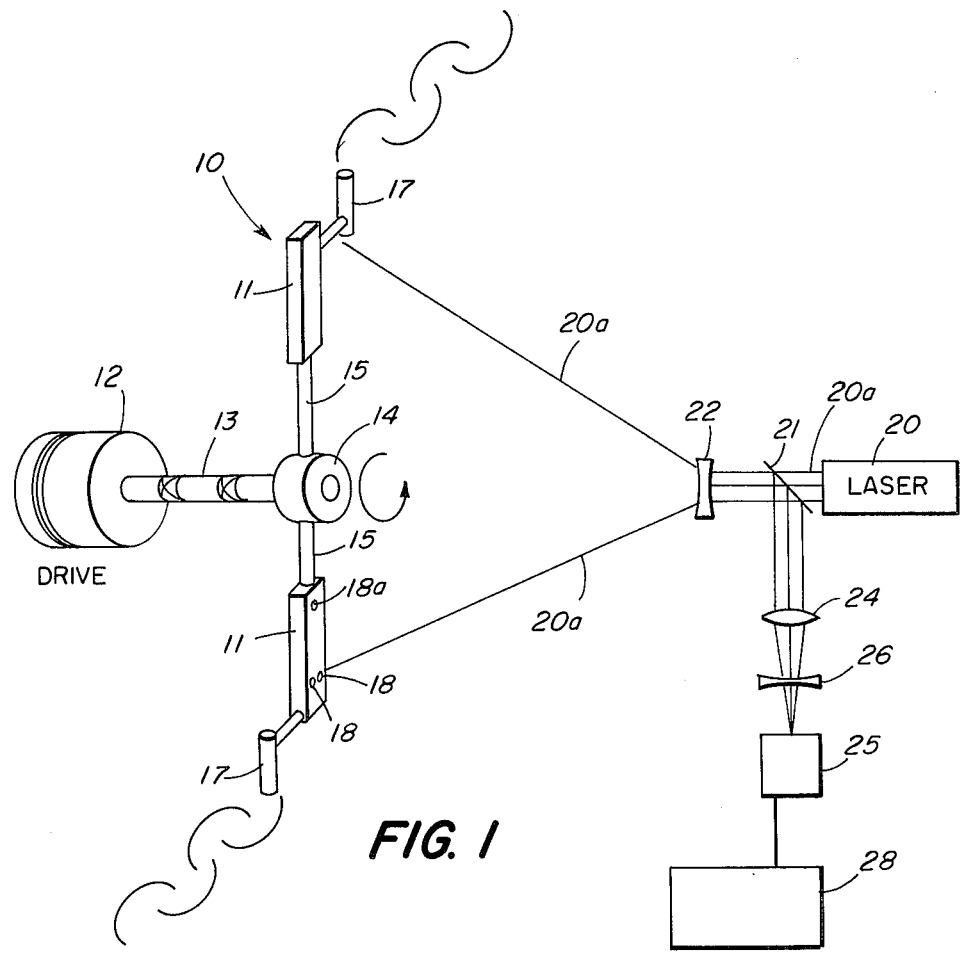
FIG. 1 is a diagrammatic view of a device to analyze blade vibration according to one embodiment of the invention.

FIG. 1 illustrates diagrammatically a system for monitoring or analyzing the vibration or other response to stress of one or more mechanical elements 11 mounted for continuous motion through a repetitive path. These mechanical elements 11 are illustrated in the mode of rotating blades. The blade assembly generally designated 10 has a drive motor 12 to drive a shaft 13 rotating a hub 14 on which are mounted a plurality of shafts 15, each of which supports an element 11. As illustrated, each of the elements 11 has mounted thereon a vortex generating member 17 which assures flexing upon rotation.

On at least one of the elements 11 are mounted at least two retroreflectors 18. Other retroreflectors 18a may also be mounted on element 11, as will be seen hereinafter. The retroreflectors 18 are so positioned on the element as to be spaced apart and as to include a portion of the element in which vibration is to be monitored. The retroreflectors 18 are positioned generally to be facing outwardly from the element surface. As is conventional in the art each retroreflector 18 includes a rear surface shaped in corner configuration with three faces or walls meeting at accurate 90° angles. As a consequence of this corner configuration, light or other radiation directed onto the face of the retroreflectors is reflected directly back onto itself. Retroreflectors can in some circumstances operate by total internal reflection but it is usual to have the rear or corner surface mirror-coated, as for example, by the evaporation of aluminum thereon.

Positioned generally in front of the blade assembly 10 is a suitable source of radiation such as a continuous laser 20. In the actual operation a helium-neon laser was employed but other lasers such as, for example, an argon laser can be employed. Positioned in front of the laser is a beam splitter reflector or mirror 21 and a lens 22 shaped to spread the laser beam. As illustrated a beam 20a from laser 20 is directed through lens 22 and is spread to include the entire path of rotation of element 11, so that retroreflectors 18 throughout their path of rotation are constantly within the field of the laser beam.

Positioned adjacent to the beam splitting mirror 21 is a lens 24 adapted to focus a beam on a sensing member or detector 25, optionally through a second lens 26. A photo multiplier is presently preferred as the detectors 25. The laser beam 20a passing through the beam splitter 21 is directed onto retroreflectors 18, and is reflected back to the beam splitter 21 and onto the detector. By virtue of the fact that a pair of retroreflectors 18 on element 11 are illuminated the image focused on photo detector 25 is in the nature of an interference pattern, and the interference fringes shift to correspond with relative motion of the illuminated retroreflectors shortening or lengthening the path of one beam relative to the other. An analyzer 28 is illustrated connected to the detector 25 to receive from the detector a signal corresponding to the changing interference pattern and to count signal pulses from the detector 25.

Figure 7:
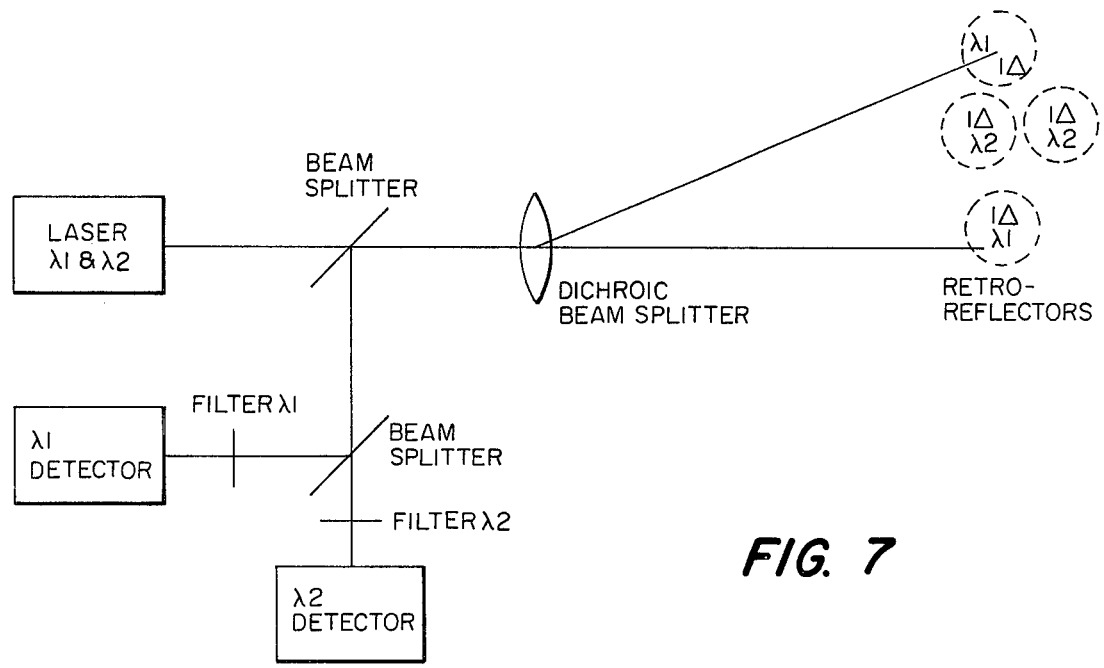
FIG. 7 is a diagrammatic view of illumination and detection of various retroreflectors that are selectively filtered to retroreflect a certain wave length of light.

More than two retroreflectors 18 can be mounted on element 11 to measure or analyze motion at different points of the element. In such case, one operative pair of retroreflectors is illuminated and the remainder preferably are shielded. Such shielding can be accomplished by means of mechanical shields (not shown), or the like, to prevent the beam 20a from reaching the non-operating retroreflectors. If desired, as shown in FIG. 7, various retroreflectors can be selectively filtered, and a laser beam of a first wave length or color, $\lambda_1$, will be retroreflected by a first pair of reflectors $\lambda$, and a beam of a second wave length or color $\lambda 2$ will be reflected by a second pair of reflectors $\lambda 2$. Thus, referring to FIG. 1, two of retroreflectors 18 are in virtually the same path of motion and a third retroreflector 18a is in a separate path of motion. Retroreflector 18a can be mechanically shielded from laser beam 20a, leaving the other two in operating mode. Alterntively, reflectors 18 can be filtered in two manners, thus selectively removing one of them from the operating mode.

The system shown in FIG. 1 typically illustrates the monitoring of a mechanical element 11 such as a blade as it is carried through repetitive motion such as rotation or the like. Vortex generators 17 can be designed or selected so as to impart high frequency or low frequency vibration or similar motion. If, for example, low frequency stress is to be monitored, detector 28 may be a display device for visual analysis. If, as is usual, high frequency vibration is being studied detector 25 can be a photocell or a photomultiplier and can measure frequencies of several thousands or millions of Hertz as is typical in high speed motion. Suitable photomultipliers are readily available as standard commercial products.

As illustrated, one of the retroreflectors 18 acts to reflect what can be considered as a reference beam while the other retroreflector 18 or 18a acts to reflect what can be considered a signal beam. When the light from two retroreflectors are directed to detector 25, a moving interference pattern results, and the motion of the pattern is due to the changing path length of the one beam with respect to the other.

FIG. 2 illustrates schematically a system similar to that of FIG. 1, useful for the measurement of blade flutter in gas turbine blades or in other systems where element 11 of FIG. 1 is a blade in a gas turbine. As illustrated, a rotating device generally designated 30 such as a compressor of a gas turbine or the like includes a plurality of blades 31 on at least one of which are two or more retroreflectors 18. A laser 20 is positioned to project beam 20a through a beam splitter 21 and a spreading lens 22 which projects the laser beam across the entire path of a revolution of the blades 31. If desired lens 22 may spread the laser beam to a ring covering only the path of motion of a path of retroreflectors 18 rather than the entire blade area, or if desired a mechanical shield (not shown) may be so employed. Positioned near the beam splitter 21 is a lens 24 to focus a reflected beam through aperture 29 onto a detector 25. Connected to a detector 25 is a frequency analyzer 32, and connected thereto are suitable devices to measure displacement 35 and frequency 34.

Figure 3:
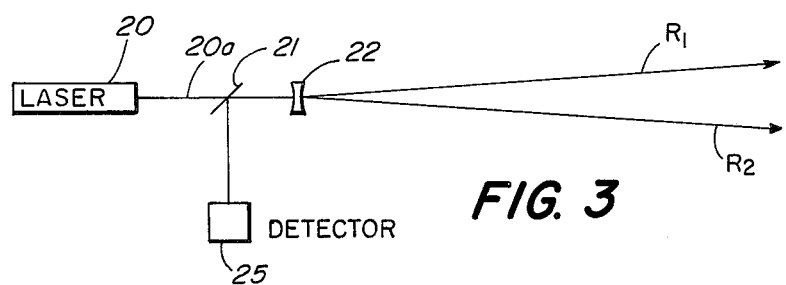
FIG. 3 is a diagrammatic view of illumination and detection of elements of the invention in accordance with either FIG. 1 or FIG. 2.
Figure 4:
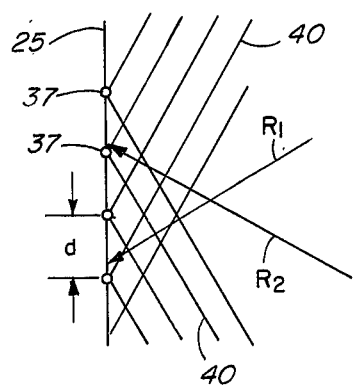
FIG. 4 is a diagrammatic representation of the detected image according to FIG. 3.

In FIG. 3 and FIG. 4 is illustrated diagrammatically the signal incident on the detector 25. The signal consists of an interference pattern having nodes 37 resulting from wave fronts 40 of two coherent or essentially monochromatic beams $R_1$ and $R_2$ directed to the detector from two retroreflectors 18. As is shown in FIG. 3, the laser 20, beam splitter 21 and spreading lens 22 provide spread beam. Two elements of the beam, shown as beam $R_1$ and beam $R_2$ represent the paths of the beam directed to a pair of retroreflectors. The return beams $R_1$ and $R_2$ in FIG. 3 are received by the detectors 25. The distances between nodes 37, shown as $d$ in FIG. 4, depends on the wave length of the beam and on the angle between beams $R_1$ and $R_2$. If the beams are nearly parallel, $d$ is larger; if the angle between $R_1$ and $R_2$ is greater, $d$ is smaller.

Referring to FIG. 4, if the length of the path of $R_1$ relative to $R_2$ increases or decreases by one wave length of light, then the interference pattern on detector 25 moves by the distance "$d$". In other words, the interference pattern shifts by the distance of one fringe or one node 37. When the active area of detector 25 is about ½ $d$ or less, then the signal moves between maximum and minimum if there is a fringe shift and the signal to noise ratio is excellent. If the active area on detector is significantly larger than distance "$d$", then the signal may still be valid but the signal to noise ratio is less favorable. Accordingly, for best signals, referring to FIG. 2, aperture 29 should be relatively small compared with the node spacings of the interference fringes or the detector 25 itself should be relatively small.

In use and operation of apparatus such as that shown in FIG. 2, the turbine blades are rotated at a suitable speed such as normal operated speed, carrying the retroreflectors 18 through their rotational paths. Laser 20 is operated to project a beam continuously onto a moving retroreflector 18 thus causing a reflected beam to impinge on the detector 25. The beam striking the detector will take the form of a time varying signal whose intensity is analyzed in the frequency analyzer 32.

The beam 20a from laser 20 is directed to project onto retroreflectors 18 during a significant portion of its path of rotation. If there are no mechanical obstructions the beam may reach the retroreflectors continuously for many revolutions. If, however, a path free from obstructions is not available, the beam 20a may be directed onto retroreflectors 18 and the reflected beam onto detector 25 for a substantial period of time. For monitoring vibration or other motion along the direction of the light paths, the two beams are reflected and directed to detector 25 for a period of time sufficient to generate a meaningful signal at the detector.

Figure 5:
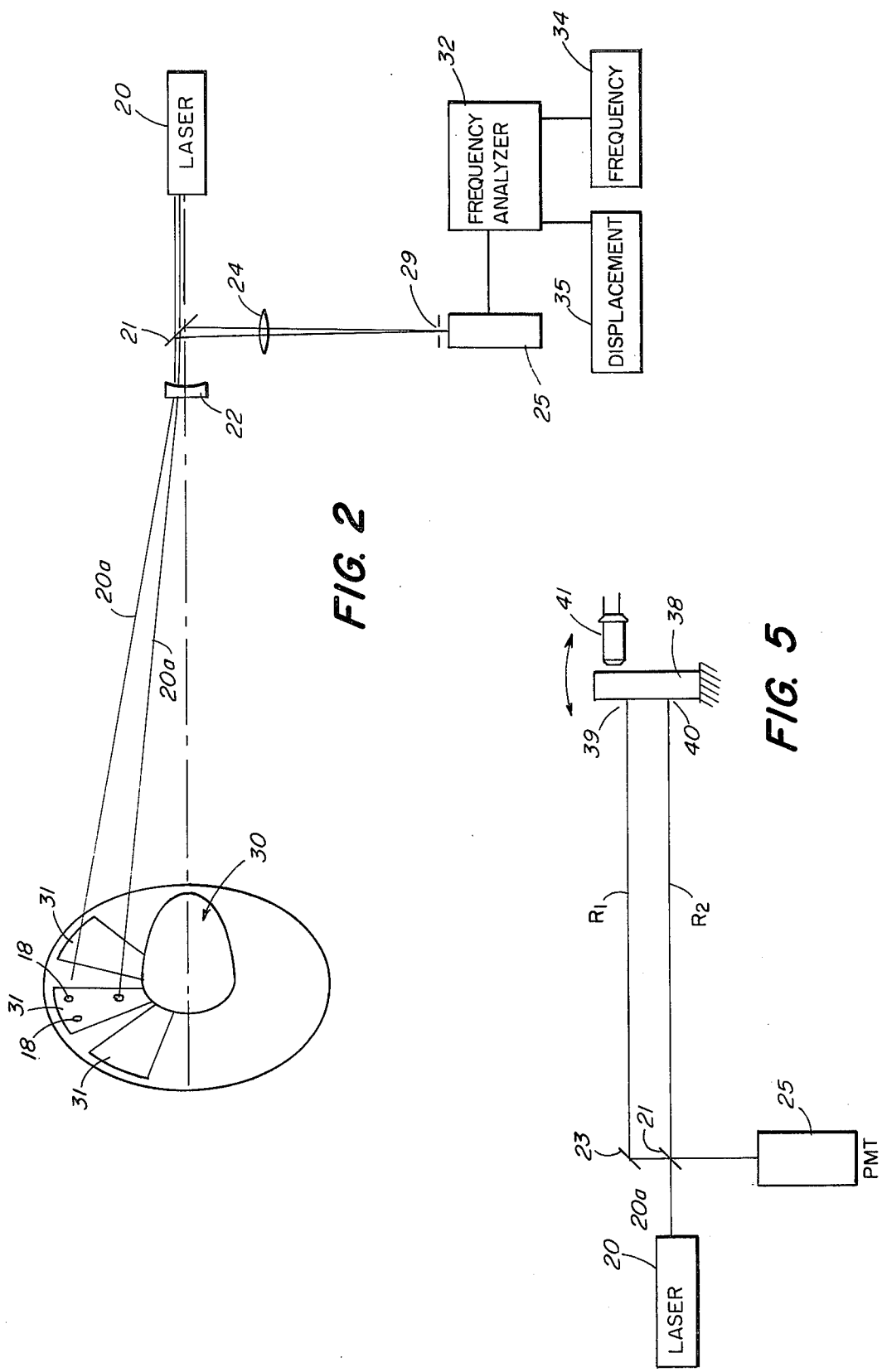
FIG. 5 is a diagrammatic view of a portion of a system according to another embodiment of the invention for analysis of non-rotating vibrating systems.

In FIG. 5 is shown another embodiment of the invention for vibrational analysis. A laser 20 projects a beam 20a through a beam splitter 21. One part of the beam is directed to a retroreflector 40 on the surface of a test object 38. The other portion of beam 20a, reaches mirror 23 and thence retroreflector 39. The beams from these retroreflectors are returned in essentially parallel paths to the beam splitter 21 and onto detector 25. A driving device 41 such as vibrational drive motor causes test object 38 to vibrate at a frequency and displacement determined by the vibrational drive device. The interference pattern which results on the detector can be analyzed to determine the vibration characters of the test object 38.

As shown in FIG. 5, beams $R_1$ and $R_2$ are virtually parallel, and as a consequence nodes 37 or bright areas between nodes are relatively large. If the paths are truly parallel, the node spacings are, in theory, infinite. The shifting of path length in response to moving one of the retroreflectors toward or away from the radiation source will nevertheless be at the same frequency as motion of the node and the frequency of the shifting nodes depends on the rate of motion toward or away from the light source.

If desired, RF signal is mixed with beam $R_1$ to cause a frequency off-set. The motion of the fringe pattern would be the sum of the RF and the relative motion of retroreflectors 39 and 40.

Figure 6:
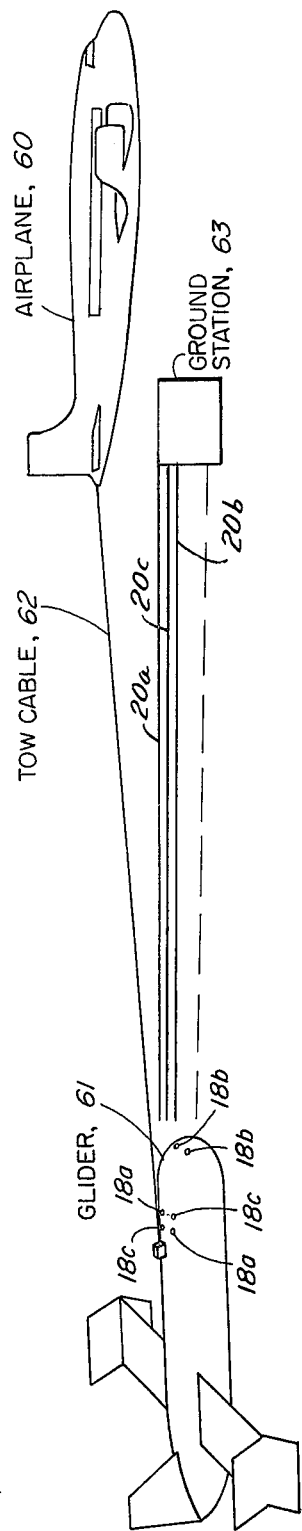
FIG. 6 is a diagrammatic view of a system for monitoring motion of a glider towed behind an airplane.

In FIG. 6 is shown a system for monitoring motion of a distant object such as an airplane or glider in flight. An airplane 60 is depicted towing a glider 61 by means of a tow cable 62. A plurality of retroreflectors such as reflectors 18a, 18b, and 18c are mounted on the glider. A detecting station 63 is positioned in the airplane 60 or, if desired on the ground or on another aircraft. The station 63 includes at least one beam source and beam receiving and analyzing means such as laser 20 and detector 25 and associated components as in FIG. 1 and FIG. 2. Desirably a plurality of beam sources and analyzing means are positioned at the detecting station 63 to operate with pairs of retroreflectors 18a, 18b, 18c. For example, three color coded pairs of reflectors 18 and three laser spectral lines 20a, 20b, 20c can monitor motion in the three directions of yaw, pitch, and roll. Similarly, a detecting station 63 can be positioned to monitor motion of a nearby or distant object, either in motion or nominally at rest such as, for example, a swaying building or the like.

We claim:

1. A method of monitoring vibration and other motion in a moving mechanical element comprising;
   mounting on said element two retroreflectors, a first retroreflector being mounted at a first location where motion relative to second location is to be monitored and a second retroreflector being mounted at said second location removed from said first location,
   directing coherent radiation from a radiation source onto both of said retroreflectors simultaneously for a substantial continuous period of time, whereby beams of said coherent radiation are reflected back upon themselves by each of said retroreflectors,
   and comparing said reflected beams.

2. A method of monitoring vibration in a moving mechanical element comprising;
   mounting on said element two retroreflectors, a first retroreflector being mounted at a first location where relative to a second location is to be monitored and a second retroreflector being mounted at said second location removed from said first location, directing coherent radiation from a radiation source onto both of said retroreflectors simultaneously for a substantial continuous period of time, whereby beams of said coherent radiation are reflected back upon themselves by each of said retroreflectors, receiving reflected beams of said coherent radiation from both of said retroreflectors and directing said beams simultaneously to a single location to form an interference pattern, and monitoring shifting of said interference pattern to determine relative motion toward or away from said source of one of said retroreflectors with respect to the other of said retroreflectors.

3. The method of claim 2, wherein said interference pattern is formed on a photoresponsive radiation detector.

4. A method of monitoring vibration in a moving mechanical element comprising;

mounting on said element two retroreflectors, a first retroreflector being mounted at a first location where vibration relative to a second location is to be monitored and a second retroreflector being mounted at said second location removed from said first location, directing coherent radiation from a radiation source onto both of said retroreflectors simultaneously for a substantial continuous period of time, whereby beams of said coherent radiation are reflected back upon themselves by each of said retroreflectors, receiving reflected beam of said coherent radiation from both of said retroreflectors and directing said beams simultaneously to a photo responsive radiation detector to form an interference pattern on said detector, and to generate an electric signal from said detector, and counting the variations of said electric signal with respect to time.

5. In a method of monitoring motion of a mechanical element the steps comprising;

mounting on said element a plurality of retroreflectors characterized by reflecting beams of electromagnetic radiation directly back on themselves, directing a beam of coherent radiation onto two at a time of said retroreflectors for reflection therefrom for a substantial, continuous period of time during mechanical movement of said element, receiving reflected beams of coherent radiation from two of said retroreflectors and comparing said reflected beams to determine an increase or decrease of path length of one of said beams relative to the other.

6. In a method of monitoring extraneous motion of a mechanical element the steps comprising;

mounting on said element a plurality of retroreflectors characterized by reflecting electromagnetic radiation directly back on itself, directing a beam of coherent radiation onto two of said retroreflectors for reflection therefrom for a substantial, continuous period of time during mechanical operation of said element, and receiving reflected beams of coherent radiation from said retroreflectors and directing said reflected beams simultaneously to a radiation detector.

7. The method of claim 6, wherein said reflected beams are directed together to an area of said detector to form an interference pattern, and counting the shifts of interference fringes to determine changes of path length of one of said beams relative to the other.

8. In a method of monitoring extraneous motion of a mechanical element the steps comprising:

mounting on said element a plurality of retroreflectors characterized by reflecting electromagnetic radiation directly back on itself, directing a laser beam onto two of said retroreflectors for a substantial continuous period of time during mechanical operation of said element, receiving reflected beams of coherent radiation from at least two of said retroreflectors and directing said reflected beams simultaneously to an area of a photoresponsive radiation detector to form an interference pattern on said area, generating an electric signal from said area of said detector and monitoring said signal to detect relative motion of one of said retroreflectors with respect to the other.

9. The method of claim 8 wherein at least two pairs of said retroreflectors are controlled to reflect only a portion of the radiation, one of said pairs of retroreflectors reflecting a first portion of the radiation and another reflecting a second portion of the radiation, and selectively directing one of at least two lasers to said retroreflectors, one of said lasers emitting radiation in said first portion of said radiation and the other laser emitting radiation in said second portion of the radiation.

10. The method of claim 9, wherein at least two beams are directed to said retroreflectors, each beam to a pair of retroreflectors, to monitor at least two factors of relative motion.

11. Apparatus for monitoring motion of a mechanical element comprising;

a pair of retroreflectors mounted on a mechanical element at two spaced locations where motion of said element is to be monitored, a source of coherent radiation, means of direct radiation from said source simultaneously to both of said retroreflectors during travel of said element through a substantial path of motion, whereby beams of said radiation are reflected back on themselves during travel through said path, means to direct said reflected beams to a single area to form an interference pattern, and means to monitor the shifting of fringes of said interference pattern.

12. Apparatus for monitoring motion of a rotating mechanical element comprising;

a pair of retroreflectors mounted on a rotating mechanical element at two spaced locations where motion of said element is to be monitored, a continuous wave laser, means to direct radiation from said laser simultaneously to both of said retroreflectors during travel of said element through a substantial path of motion, whereby beams of said radiation are reflected back on themselves during travel through said path, means to direct said reflected beams to a single area of a photoresponsive detector to form an interference pattern thereon, and means to receive and monitor a signal from said detector to detect and monitor shifting of fringes of said interference pattern.

13. Apparatus for monitoring motion of a turbine blade comprising;
- a pair of retroreflectors mounted on said blade at two spaced locations where motion is to be monitored,
- a laser,
- means to direct a beam from said laser simultaneously to both of said retroreflectors during travel of the blade through a substantial path of motion, whereby reflected laser beams are reflected directly back on themselves during travel through said path,
- means to direct said beams together to form an interference pattern,
- a photoresponsive detector positioned to receive said interference pattern, said detectors having an operating surface area smaller in diameter than the distance between nodes of said interference pattern.

14. Apparatus for monitoring vibration of a rotating blade comprising;
- a pair of retroreflectors mounted on said blade at two spaced locations where vibration is to be monitored,
- a laser,
- means to direct a beam from said laser simultaneously to both of said retroreflectors during blade rotation through a substantial path of motion, whereby two laser beams are reflected back on themselves,
- means to form an interference pattern from said beams,
- a photoresponsive detector positioned to receive said interference pattern,
- means to receive an electric signal from said detector, and
- means to count pulses of said signal to identify shifting of fringes of said interference pattern.

* * * * *